US009846534B2

(12) United States Patent
Yamat et al.

(10) Patent No.: US 9,846,534 B2
(45) Date of Patent: Dec. 19, 2017

(54) INSET DYNAMIC CONTENT PREVIEW PANE

(71) Applicant: Microsoft Corporation, Redmond, WA (US)

(72) Inventors: James Yamat, San Jose, CA (US); William H Vong, Hunts Point, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 400 days.

(21) Appl. No.: 13/917,596

(22) Filed: Jun. 13, 2013

(65) Prior Publication Data

US 2014/0372893 A1 Dec. 18, 2014

(51) Int. Cl.
| | | |
|---|---|---|
| *G06F 3/048* | (2013.01) | |
| *G06F 3/0488* | (2013.01) | |
| *G06F 3/0481* | (2013.01) | |
| *G06F 3/0485* | (2013.01) | |
| *G06F 17/21* | (2006.01) | |

(52) U.S. Cl.
CPC .......... *G06F 3/0488* (2013.01); *G06F 3/0481* (2013.01); *G06F 3/0485* (2013.01); *G06F 17/212* (2013.01)

(58) Field of Classification Search
CPC ....... G11B 27/34; G11B 27/034; G11B 27/28; G11B 27/036; G11B 27/105; G11B 27/329; G11B 20/00731
See application file for complete search history.

(56) References Cited

U.S. PATENT DOCUMENTS

| | | |
|---|---|---|
| 6,121,963 A | 9/2000 | Ange |
| 6,404,441 B1 | 6/2002 | Chailleux |
| 7,058,891 B2 | 6/2006 | O'Neal et al. |
| 8,140,975 B2 | 3/2012 | Lemay et al. |
| 2002/0191013 A1 | 12/2002 | Abrams |
| 2005/0091254 A1 | 4/2005 | Stabb et al. |
| 2009/0259927 A1 | 10/2009 | Fisher |

(Continued)

FOREIGN PATENT DOCUMENTS

EP 2323134 A1 5/2011

OTHER PUBLICATIONS

"International Search Report and Written Opinion for PCT Application No. PCT/US2014/40195", dated Oct. 31, 2014, 11 Pages.

(Continued)

*Primary Examiner* — Di Xiao
(74) *Attorney, Agent, or Firm* — Merchant & Gould P.C.

(57) ABSTRACT

A preview of dynamic effects in a document is provided. As a user scrolls through pages of a document, for example, slides of a slide presentation, a static representation of each page may be displayed in a main viewing area, and a dynamic view of any dynamic effects may be displayed in an inset preview pane. The preview pane may be provided in a corner of the main viewing area, and may display the dynamic effects in a loop or upon selection. Accordingly, a user may be able to scroll through a document without having to click through interactive content on a page, and concurrently may be informed of and have an opportunity to view the dynamic effects in a preview pane.

20 Claims, 13 Drawing Sheets

(56) References Cited

U.S. PATENT DOCUMENTS

| | | |
|---|---|---|
| 2010/0123908 A1 | 5/2010 | Denoue et al. |
| 2010/0153849 A1 | 6/2010 | West |
| 2010/0218100 A1 | 8/2010 | Simon et al. |
| 2011/0022960 A1 | 1/2011 | Glover |
| 2011/0181602 A1* | 7/2011 | Boda et al. .................. 345/473 |
| 2011/0191666 A1 | 8/2011 | Decker et al. |
| 2012/0089499 A1* | 4/2012 | Balthaser ........................ 705/35 |
| 2014/0033006 A1* | 1/2014 | Easter et al. .................. 715/205 |

OTHER PUBLICATIONS

Asnawi, et al., "Unifying Multimedia Player and Presentation System with Utilizing Dual-Display Feature", http://ieeexplore.ieee.org/stamp/stamp.jsp?tp=&arnumber=5561372, In Proceedings of the 4th International Symposium on Information Technology, Jun. 15, 2010, 6 pages.

"Second Written Opinion Issued in PCT Patent Application No. PCT/US2014/40195", dated Jun. 12, 2015, 5 Pages.

"International Preliminary Report on Patentability Issued in PCT Application No. PCT/US2014/40195", dated Sep. 21, 2015, 9 Pages.

\* cited by examiner

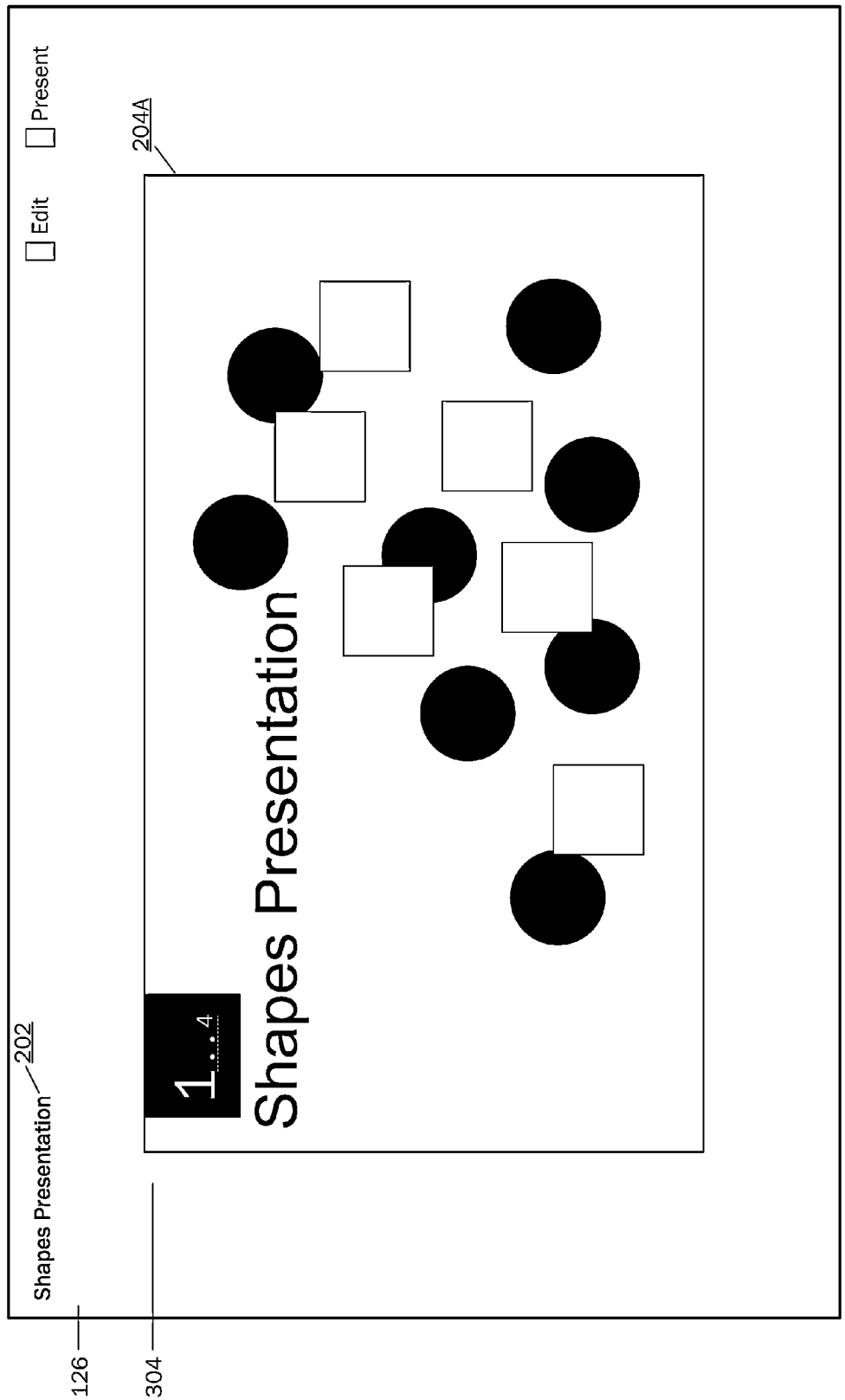

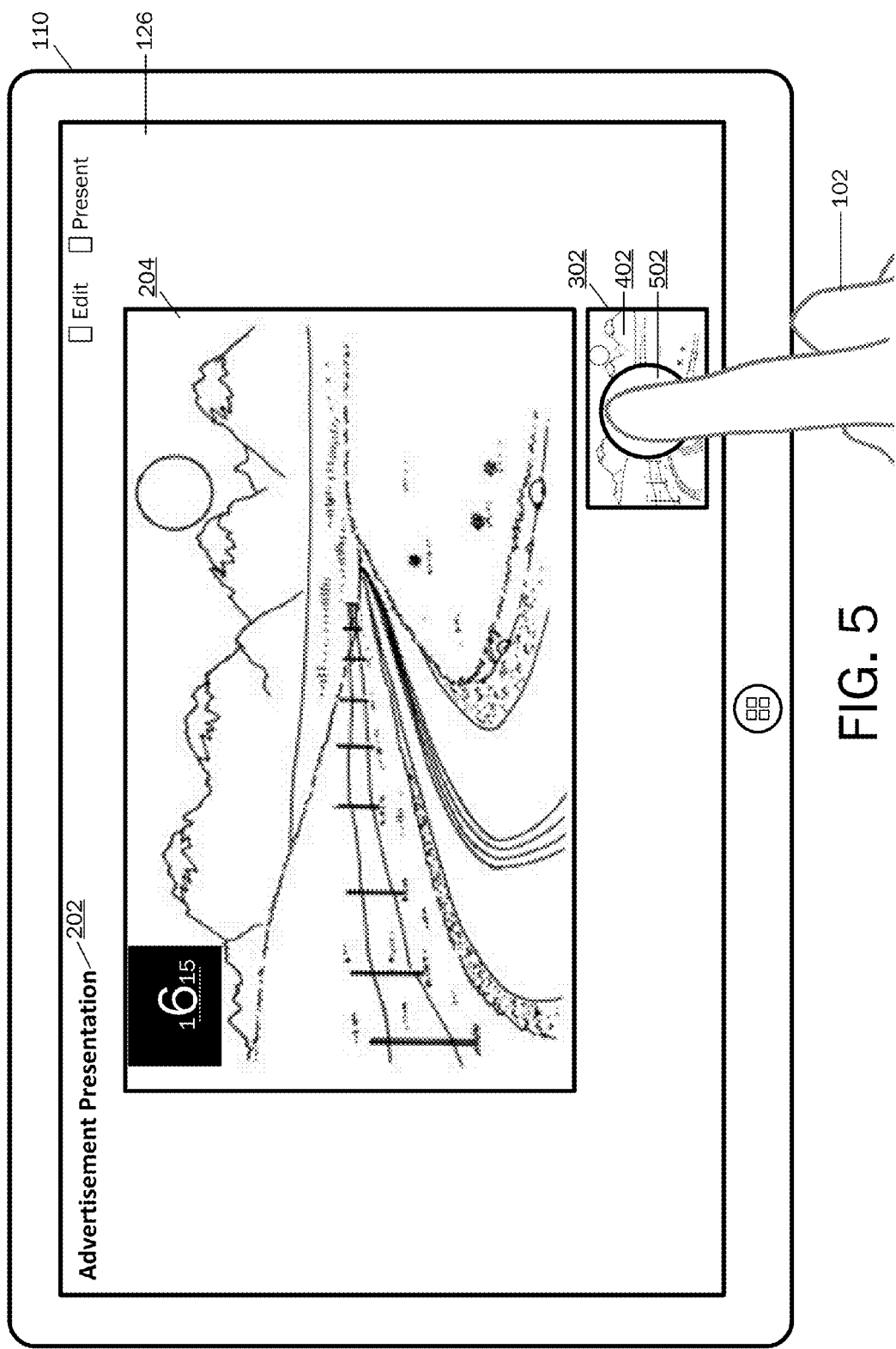

INSET DYNAMIC CONTENT PREVIEW PANE

BACKGROUND

Oftentimes when using a computer software application, such as a slide presentation application, a user may browse or scan through pages of a document (e.g., slides of a slide presentation). If the document (e.g., slide presentation) comprises dynamic content, such as animations, transition effects, video content, interactive content, etc., the user may either have to click (or tap) through each dynamic effect to work his way through the document, or the user may have to play the dynamic content if the document (e.g., slide presentation) is in slideshow mode, which may force the user out of context of editing, and thus interrupting user flow. As can be appreciated, this may very time-consuming and inefficient. Alternatively, a collapsed version of a page (e.g., slide) may be displayed, wherein the dynamic content may be displayed as a single static representation on the page. A user may be able to skim through a document (e.g., slide presentation) quickly; however, the user may wish to view the dynamic effects.

It is with respect to these and other considerations that the present invention has been made.

SUMMARY

This summary is provided to introduce a selection of concepts in a simplified form that are further described below in the detailed description. This summary is not intended to identify key features or essential features of the claimed subject matter, nor is it intended as an aid in determining the scope of the claimed subject matter.

Embodiments of the present invention solve the above and other problems by providing an inset preview pane for displaying dynamic content in a document. According to embodiments, as a user scrolls through pages (e.g., slides) of a document (e.g., slide presentation), a static representation of each page may be displayed in a main viewing area, and a dynamic view of any dynamic content (e.g., animations, transition effects, video, interactive content, etc.) may be displayed in a preview pane. The preview pane may be provided in a corner of the main viewing area. Accordingly, a user may be able to scroll through a document (e.g., slide presentation) without having to click or select through the dynamic effects on a page (e.g., slide), and may be informed of and have an opportunity to view the dynamic content in a preview area.

The details of one or more embodiments are set forth in the accompanying drawings and description below. Other features and advantages will be apparent from a reading of the following detailed description and a review of the associated drawings. It is to be understood that the following detailed description is explanatory only and is not restrictive of the invention as claimed.

BRIEF DESCRIPTION OF THE DRAWINGS

The accompanying drawings, which are incorporated in and constitute a part of this disclosure, illustrate various embodiments of the present invention. In the drawings:

FIG. 3A is an illustration of a slide, wherein the slide does not comprise dynamic content;

FIG. 5 is an illustration of an inset dynamic content preview pane comprising a functionality control for activating play of the dynamic content;

DETAILED DESCRIPTION

Figure 1:
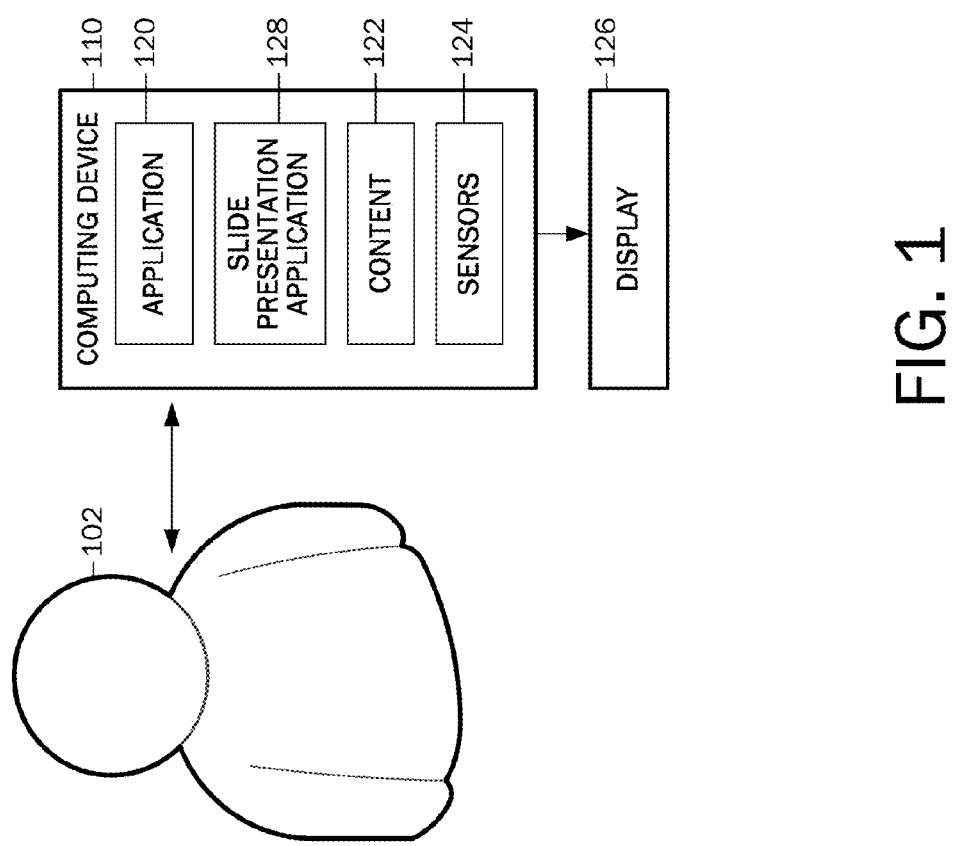
FIG. 1 is a simplified block diagram of a system providing a preview of dynamic content in an inset dynamic content preview pane.

As briefly described above, embodiments of the present invention are directed to providing a preview of dynamic content in an inset dynamic content preview pane.

The following detailed description refers to the accompanying drawings. Wherever possible, the same reference numbers are used in the drawing and the following description to refer to the same or similar elements. While embodiments of the invention may be described, modifications, adaptations, and other implementations are possible. For example, substitutions, additions, or modifications may be made to the elements illustrated in the drawings, and the methods described herein may be modified by substituting, reordering, or adding stages to the disclosed methods. Accordingly, the following detailed description does not limit the invention, but instead, the proper scope of the invention is defined by the appended claims.

Referring now to the drawings, in which like numerals represent like elements, various embodiments will be described. FIG. 1 is a block diagram illustrating a network architecture 100 for a preview of dynamic content in an inset dynamic content preview pane in accordance with various embodiments. The network architecture 100 includes a computing device 110. The computing device 110 may be one of various types of computing devices (e.g., a tablet computing device, a desktop computer, a mobile communication device, a laptop computer, a laptop/tablet hybrid computing device, a large screen multi-touch display, a gaming device, a smart television, or other types of computing devices) for executing applications 120 for performing a variety of tasks.

A user 102 may utilize an application 120 on a computing device 110 for a variety of tasks, which may include, for example, to write, calculate, draw, organize, prepare presentations, send and receive electronic mail, take and organize notes, make music, and the like. According to embodiments, the computing device 110 may include a slide presentation application 128, which may be utilized to create, edit, view, and present slide presentations. Applications 120 may include thick client applications, which may be stored locally on the computing device 110 (as illustrated in FIG. 1), or may include thin client applications (i.e., web applications) that may reside on a remote server and accessible over a network, such as the Internet or an intranet. A thin client application may be hosted in a browser-controlled environment or coded in a browser-supported language and reliant on a common web browser to render the application executable on a computing device 110.

The computing device 110 may be configured to receive content 122 for presentation on a display 126 (which may comprise a touch screen display). For example, content 122 may include a slide presentation 202 comprising one or more pages or slides 204.

An application 120 may be configured to enable a user 102 to use a pointing device (e.g., a mouse, pen/stylus, etc.) and/or to utilize sensors 124 (e.g., touch sensor, accelerometer, hover, facial recognition, voice recognition, light sensor, proximity sensor, gyroscope, tilt sensor, GPS, etc.) on the computing device 110 to interact with content 122 via a number of input modes. To assist users to locate and utilize functionalities of a given application 120, a user interface (UI) containing a plurality of selectable functionality controls may be provided.

Figure 2:
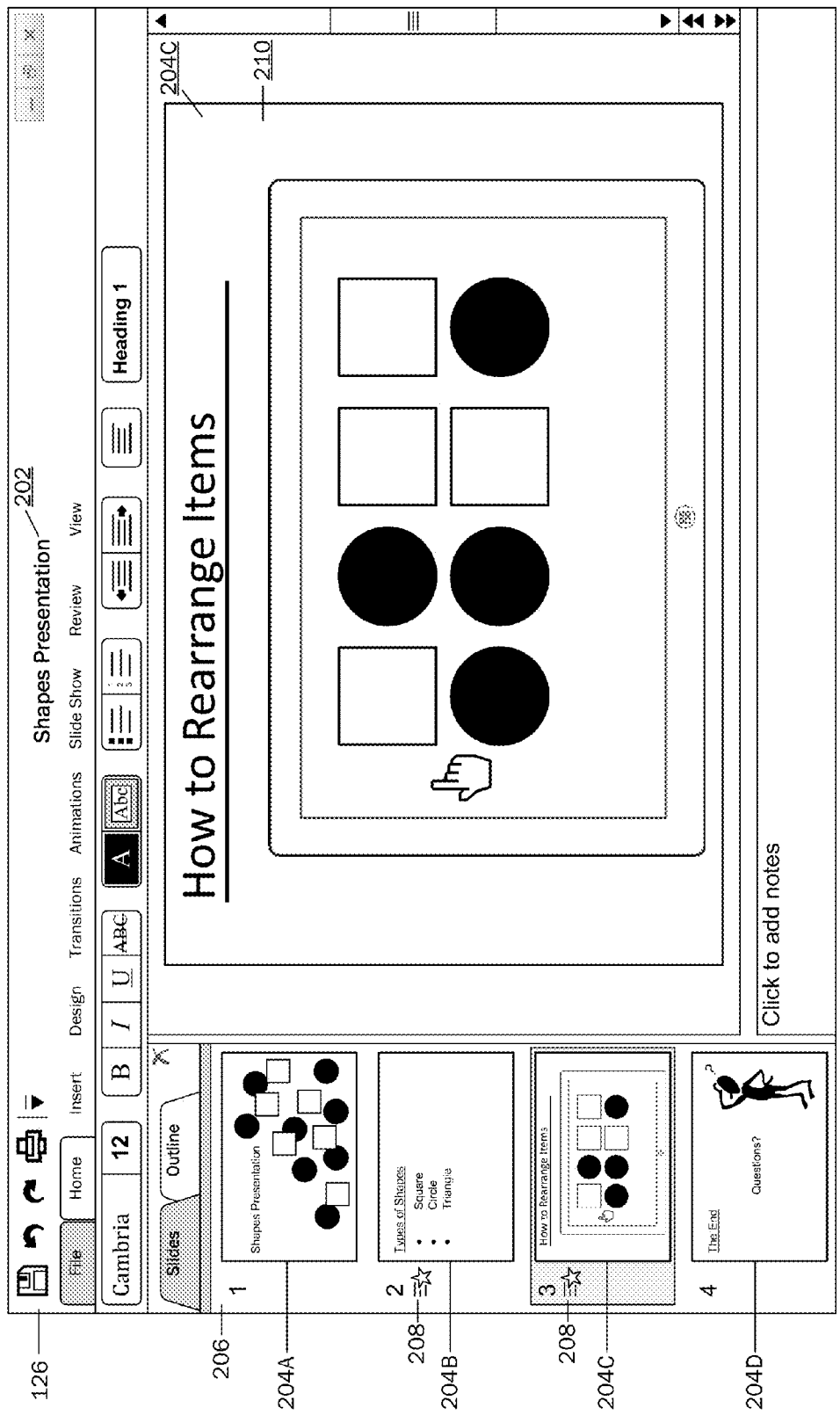
FIG. 2 is an illustration of a slide comprising dynamic content, wherein transitioning of the dynamic content may not be displayed, according to current methods and systems.

Referring now to FIG. 2, an example of a collapsed static representation 210 of a slide 204C of a slide presentation 202 according to current methods and systems is illustrated. Although described herein as displaying interactive content in a slide of a slide presentation, it should be understood that embodiments are not limited to such, and may include various types of documents comprising dynamic content. As described above, currently, when a user 102 scrolls through slides 204 of a slide presentation 202, and if a slide 204 comprises dynamic content, he may either have to click through each animation, effect and transition, or may be provided with a collapsed static representation 210 as illustrated in FIG. 2. When a slide 204 is displayed as statically collapsed, a user 102 may be unaware of various effects and animations that may be meaningful. An animation icon 208 may be displayed next to a slide 204 in a preview area 206 to indicate that the slide 204 comprises dynamic content, such as animations, transition effects, video content, interactive content, etc.

Embodiments of the present invention provide a preview of dynamic content in an inset dynamic content preview pane. According to an embodiment and as illustrated in FIG. 3A, if a slide 204 does not comprise dynamic content, an inset pane may not be displayed. For example, the slide 204A shown displayed in the main viewing area 304 of the display 126 is a first slide 204 of an example slide presentation 202 comprising four slides as can be seen in the preview area 206 in FIG. 2. As can be seen, an animation icon 208 is not displayed next to the slide 204A in the preview area 206, and thus indicating that the slide 204 does not comprise dynamic content, such as animations, transition effects, video content, etc.

Figure 3B:
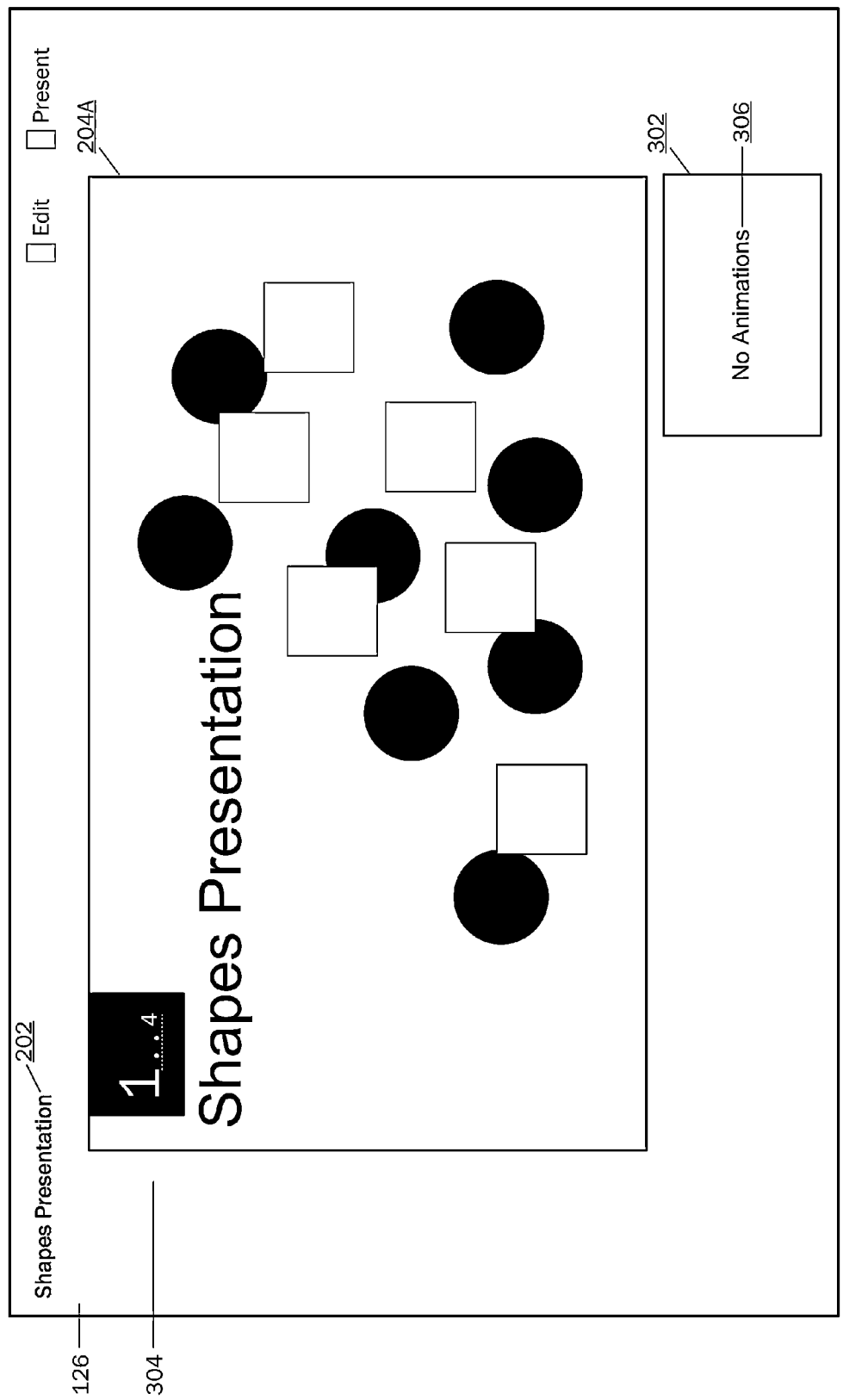
FIG. 3B is an illustration of a slide and an inset dynamic content preview pane, wherein a notification is provided that the slide does not comprise dynamic content.

Referring now to FIG. 3B, an inset pane (herein referred to as a dynamic preview pane 302) may be provided within an application 120 user interface displayed on computing device display 126. If a slide 204 comprises dynamic content, such as an animation, transition effects, interactive content, or other dynamic content, a preview of the dynamic content may be displayed in the dynamic preview pane 302. According to one embodiment, the dynamic preview pane 302 may be a smaller pane displayed adjacent to a main view of a slide 204 in a main viewing area 304. For example, interactive content may include an embedded web application in a document (e.g., in a slide presentation 202). The interactive content may represent an interactive map that a user may be able to manipulate in real-time. According to an embodiment, possible interactions may be displayed in the dynamic preview pane 302. According to an embodiment and as illustrated in FIG. 3B, if a slide 204 does not comprise any dynamic content, an indication of such (i.e., no-animations notification 306) may be provided in the dynamic preview pane 302.

Figure 4A:
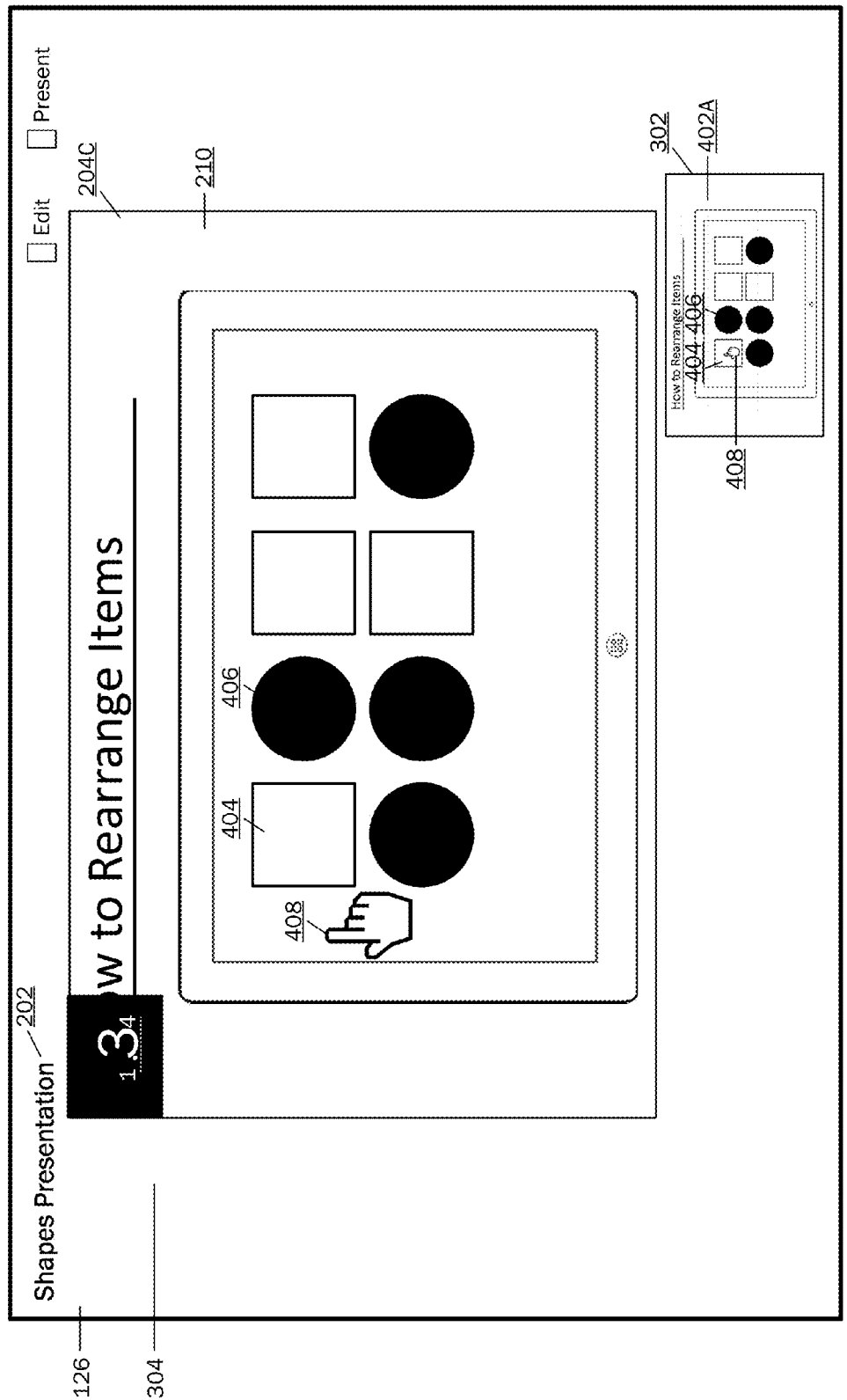
FIGS. 4A-4C are illustrations of a slide and an inset dynamic content preview pane, wherein the slide comprises dynamic content and a preview of the dynamic content is displayed in the inset dynamic content preview pane.
Figure 4B:
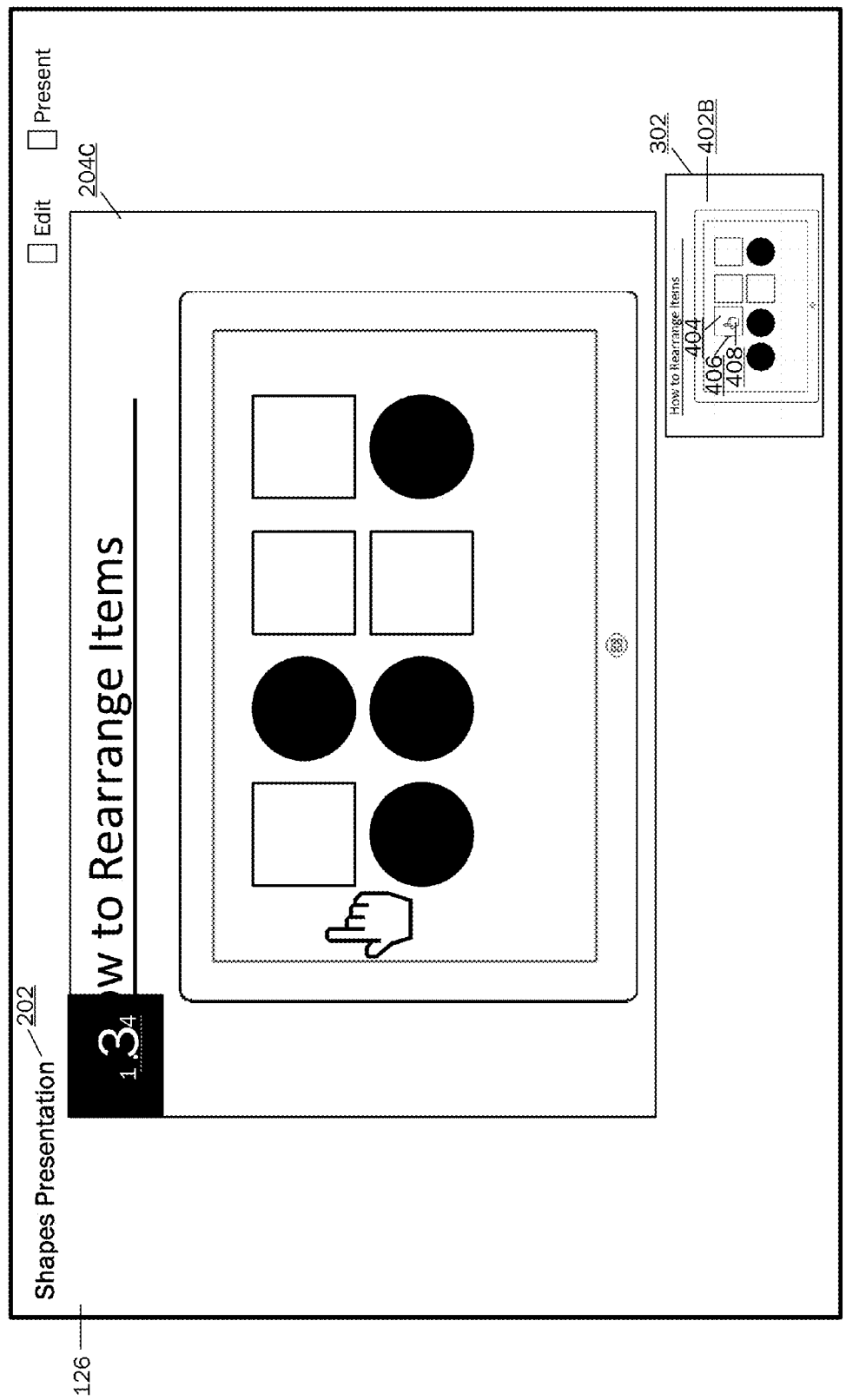
Figure 4C:
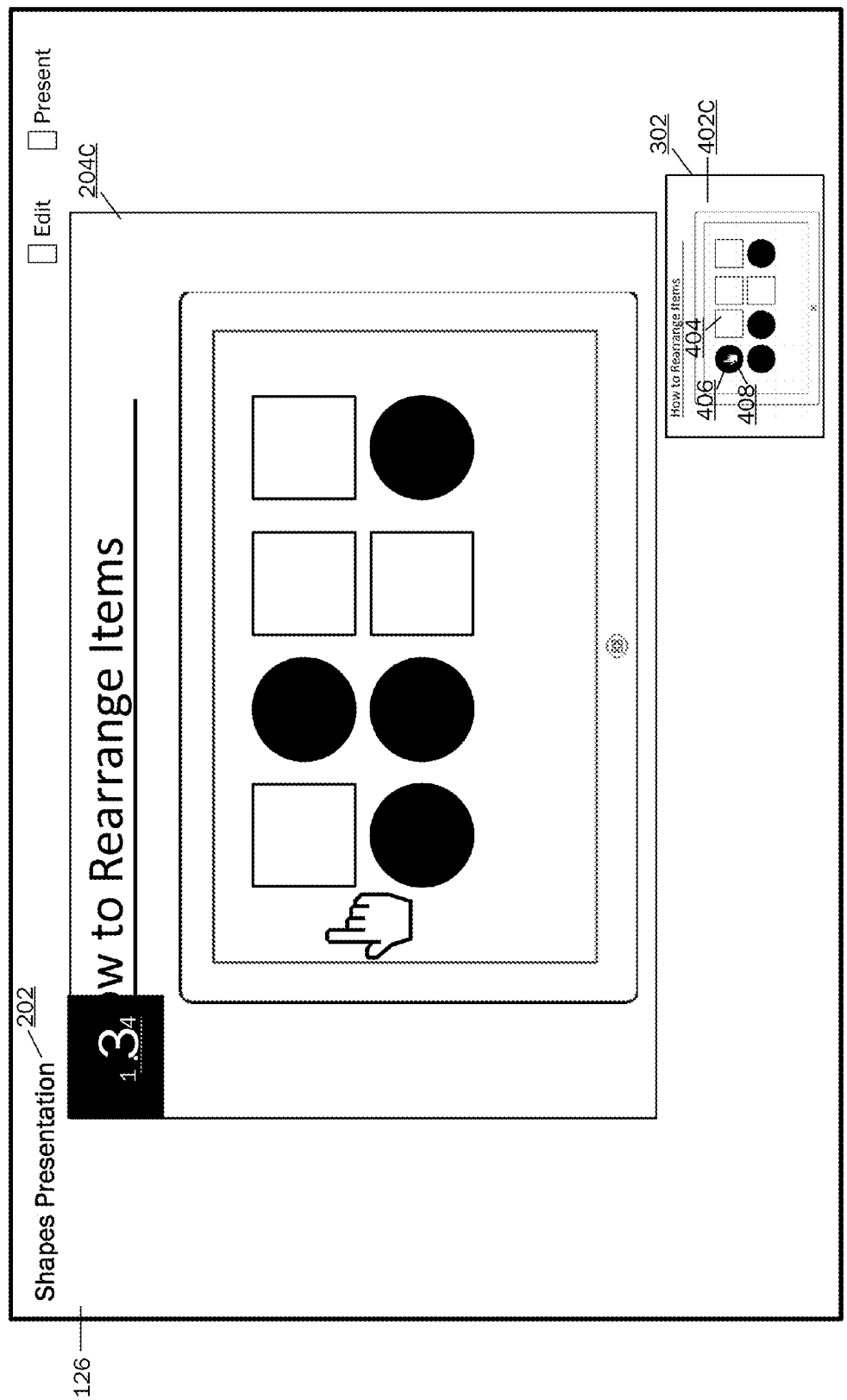

With reference now to FIGS. 4A-4C, a third slide 204C of the example slide presentation 202 is shown displayed in the main viewing area 304 of the application user interface. As indicated by the animation icon 208 displayed next to the slide 204C in the preview area 206 of FIG. 2, the third slide 204C comprises animations, transitions, interactive content, or other dynamic content 402. According to embodiments, if a slide 204 comprises dynamic content 402, the view of the slide 204 displayed in the main viewing area 304 may be a collapsed static representation 210 of the slide. A dynamic view may be displayed in the dynamic preview pane 302, wherein any animations, transitions, video content, interactive content, or other dynamic content 402 incorporated into the slide 204 may play in the dynamic view.

For example, the third slide 204C of the example slide presentation 202 comprises dynamic content 402, the dynamic content 402 comprising a rearrangement of two shapes (a square 404 and a circle 406) via a selector 408 and displayed on a tablet device. Each animation step or dynamic effect 402A-D is shown in FIGS. 4A-4C. That is, the first dynamic effect 402A is illustrated in FIG. 4A, the second dynamic effect 402B is illustrated in FIG. 4B, and the third dynamic effect 402C is illustrated in FIG. 4C. According to embodiments, the dynamic content 402 in a slide 204 may play in sequence in the dynamic preview pane 302, allowing a user 102 to see a preview of the animation/dynamic content 402. As shown in the dynamic preview pane 302 in FIG. 4A, the first dynamic effect 402A is the selector 408 selecting the square 404. As shown in FIG. 4B, the animation progresses to the second dynamic effect 402B, where the selector 408 moves the square 404 over the circle 406. Moving on to FIG. 4C, the animation progresses to the third dynamic effect 402C, where the selector 408 moves the circle 406 to the empty space.

According to embodiments, a preview of dynamic content 402 in a slide 204 may be provided in the dynamic preview pane 302 in various ways. For example, dynamic content 402 in a slide 204 may play in the dynamic preview pane 302 a predetermined number of times (e.g., once, twice, five times, etc.), may play a predetermined number of times when a slide 204 is presented in the main viewing area 304, may play continuously in a loop as long as the slide 204 is displayed in the main viewing area 304, or may play upon selection of a play functionality control 502 as illustrated in FIG. 5.

Figure 6:
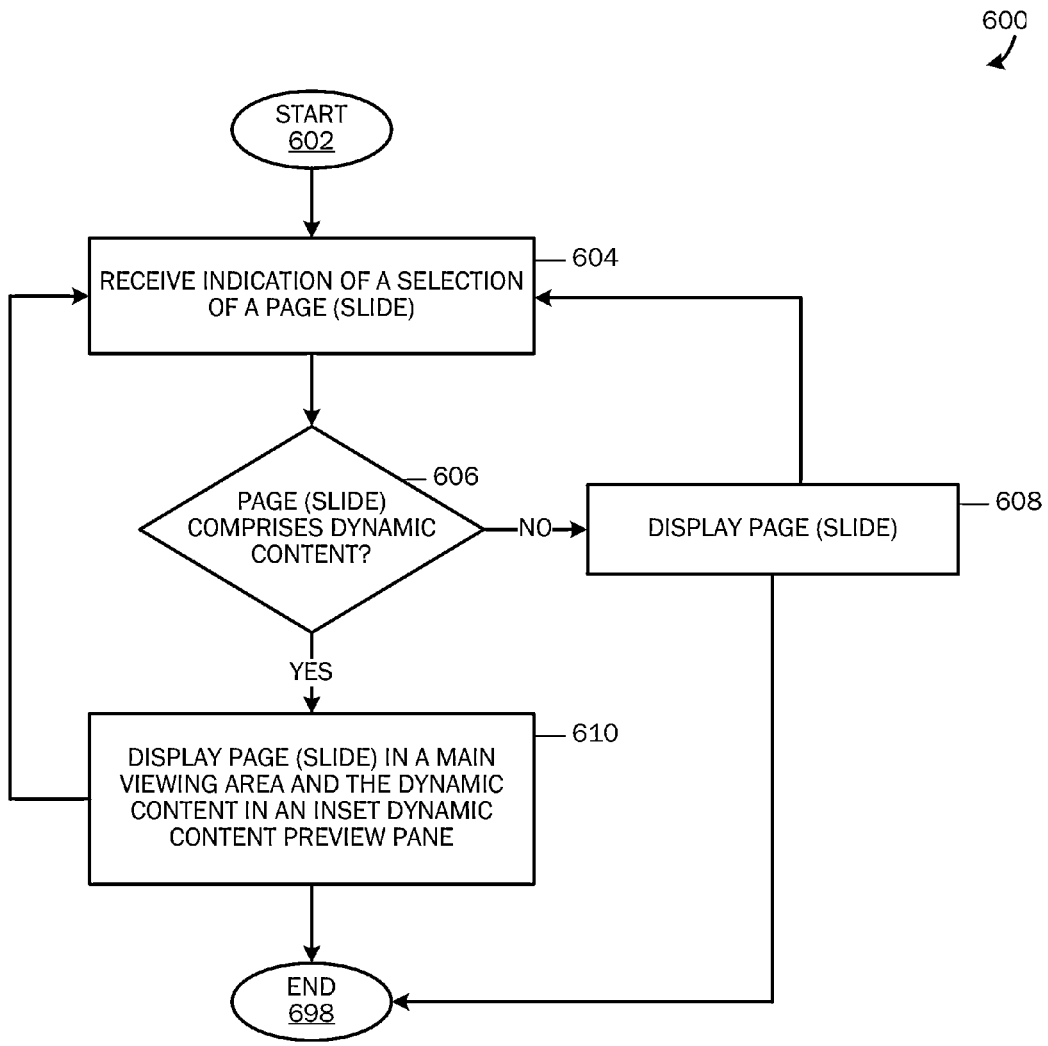
FIG. 6 a flow chart of a method for providing a preview of dynamic content in an inset dynamic content preview pane.

FIG. 6 is a flow chart showing one embodiment of a method 600 for providing preview of dynamic content in an inset dynamic content preview pane. The method 600 starts at OPERATION 602 and proceeds to OPERATION 604 where an indication of a selection to display a page of a document in an application 120 is received. For example, a user 102 may open a slide presentation 202 in a slide presentation application 128. An indication to display the first slide 204 of the slide presentation 202 may be received upon opening the slide presentation 202, or an indication of a selection to display a slide 204 may be received as the user scrolls through one or more slides 204 of the slide presentation 202.

When an indication of a selection to display a page (e.g., slide 204) is received, the method 600 may proceed to DECISION OPERATION 606, where a determination may be made as to whether the page (e.g., slide 204) comprises dynamic content 402 (e.g., animations, transition effects, video content, interactive content, etc.). If the page (e.g., slide 204) does not comprise dynamic content 402, the method 600 may proceed to OPERATION 608, where the page (e.g., slide 204) may be displayed in a main viewing area 304 of the application 120,128 UI. According to an embodiment, a no-animations notification 306 may be displayed in an inset dynamic preview pane 302 indicating that the page (e.g., slide 204) does not comprise dynamic content 402.

If a determination is made at DECISION OPERATION 606 that the page (e.g., slide 204) does comprise dynamic content 402 (e.g., animations, transition effects, video content, interactive content, etc.), the method 600 may proceed to OPERATION 610, where a collapsed static representation 210 of the page (e.g., slide 204) may be displayed in a main viewing area 304 of the application 120,128 UI, and the dynamic content 402 of the page (e.g., slide 204) may be provided in the an inset dynamic preview pane 302. As described above, the dynamic content 402 may be provided in various ways, for example, may play automatically, may play in a loop, may play once, may play a predetermined number of times, or may play upon receiving a selection of a play functionality control 502. The method 600 may return to OPERATION 604, where an indication of a selection to display another page (e.g., slide 204) may be received, or may end at OPERATION 698.

While the invention has been described in the general context of program modules that execute in conjunction with an application program that runs on an operating system on a computer, those skilled in the art will recognize that the invention may also be implemented in combination with other program modules. Generally, program modules include routines, programs, components, data structures, and other types of structures that perform particular tasks or implement particular abstract data types.

The embodiments and functionalities described herein may operate via a multitude of computing systems including, without limitation, desktop computer systems, wired and wireless computing systems, mobile computing systems (e.g., mobile telephones, netbooks, tablet or slate type computers, notebook computers, and laptop computers), handheld devices, perceptive pixel displays, gaming devices, smart televisions, large multi-touch systems, wall systems, multiprocessor systems, microprocessor-based or programmable consumer electronics, minicomputers, and mainframe computers.

In addition, the embodiments and functionalities described herein may operate over distributed systems (e.g., cloud-based computing systems), where application functionality, memory, data storage and retrieval and various processing functions may be operated remotely from each other over a distributed computing network, such as the Internet or an intranet. User interfaces and information of various types may be displayed via on-board computing device displays or via remote display units associated with one or more computing devices. For example user interfaces and information of various types may be displayed and interacted with on a wall surface onto which user interfaces and information of various types are projected. Interaction with the multitude of computing systems with which embodiments of the invention may be practiced include, keystroke entry, touch screen entry, voice or other audio entry, gesture entry where an associated computing device is equipped with detection (e.g., camera) functionality for capturing and interpreting user gestures for controlling the functionality of the computing device, and the like.

Figure 7:
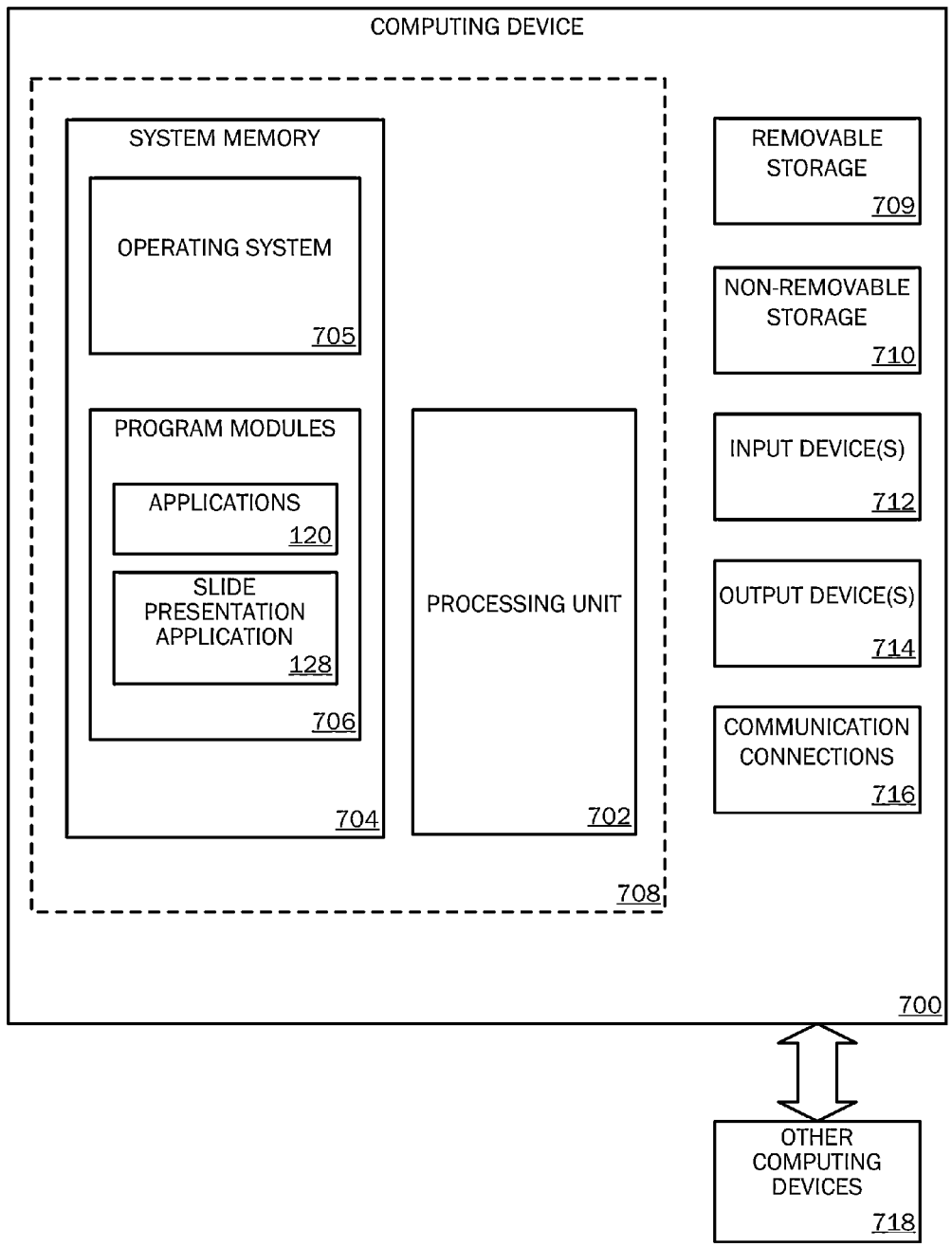
FIG. 7 is a block diagram illustrating example physical components of a computing device with which embodiments of the invention may be practiced.
Figure 8A:
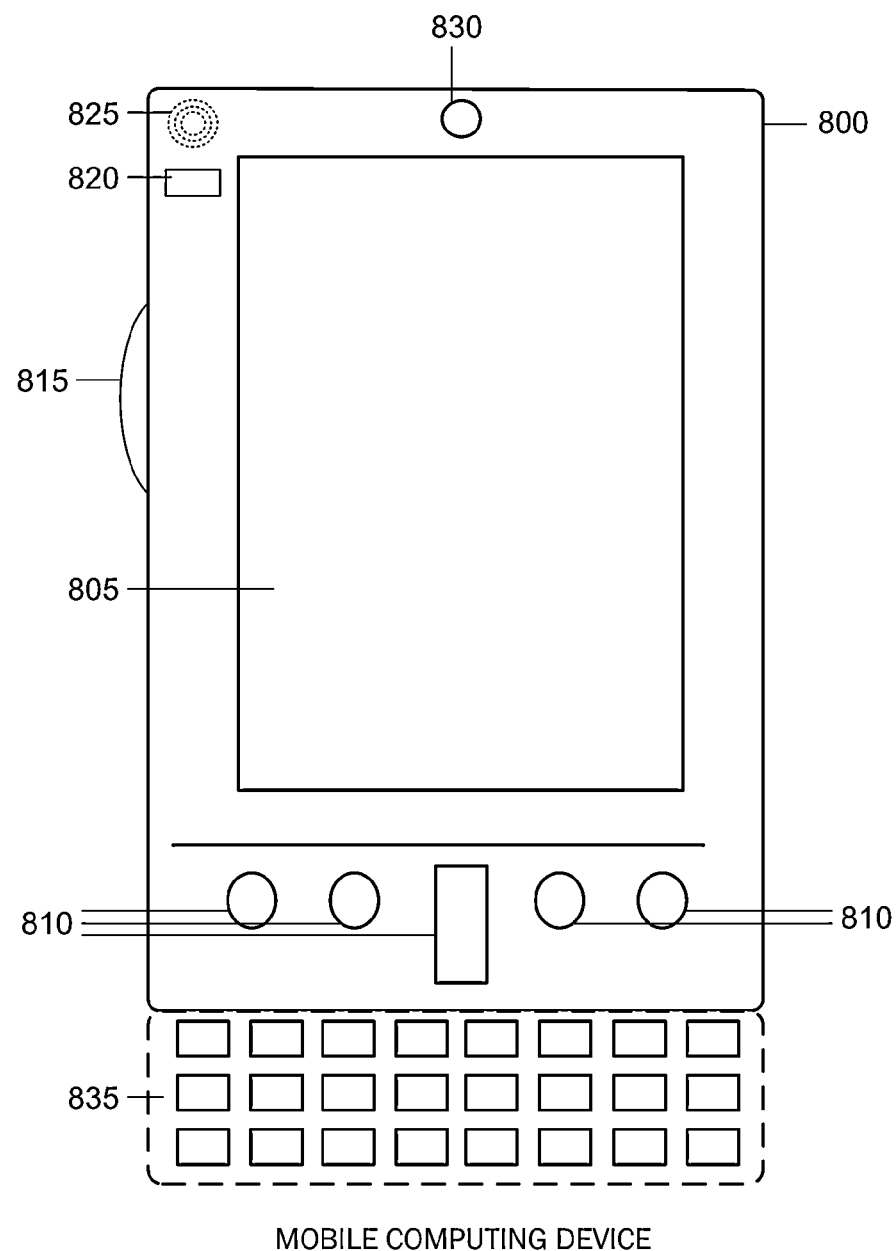
FIGS. 8A and 8B are simplified block diagrams of a mobile computing device with which embodiments of the present invention may be practiced.
Figure 8B:
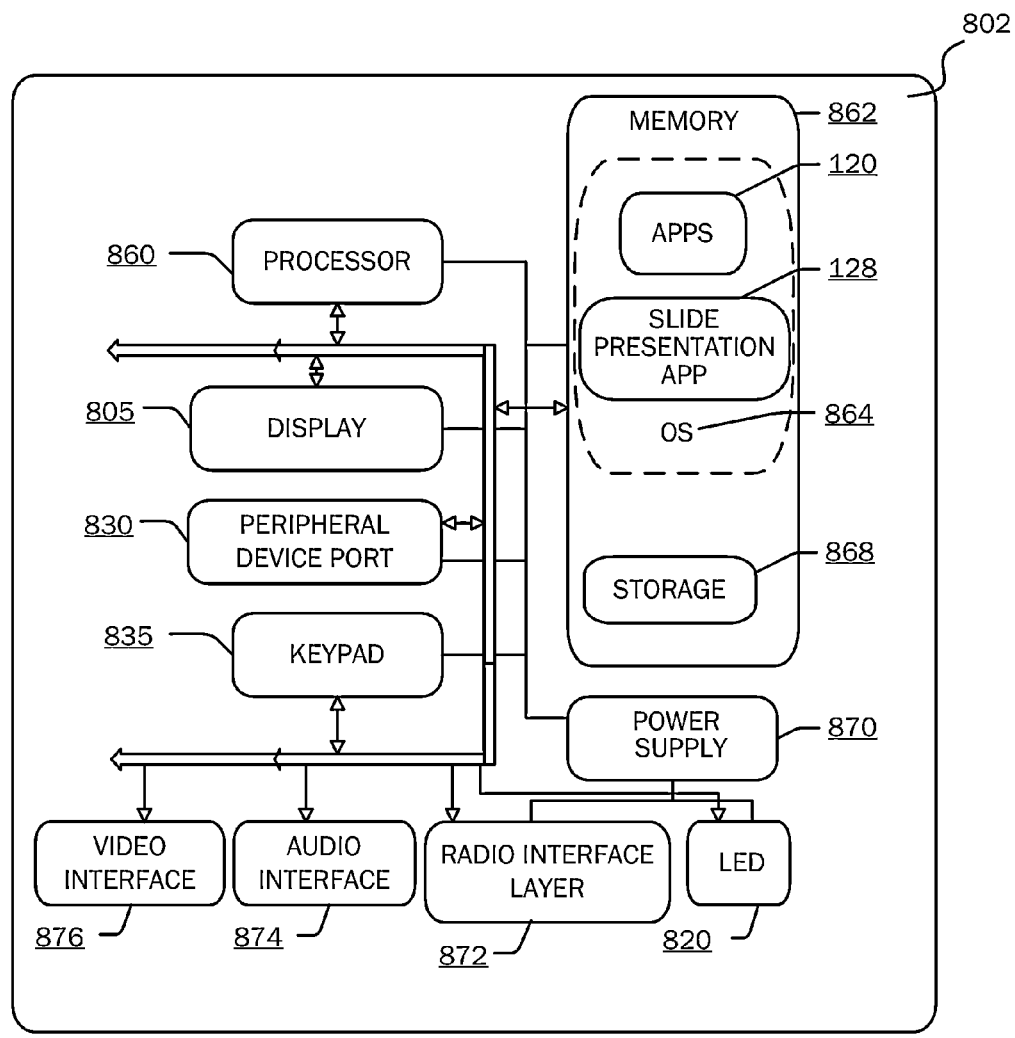
Figure 9:
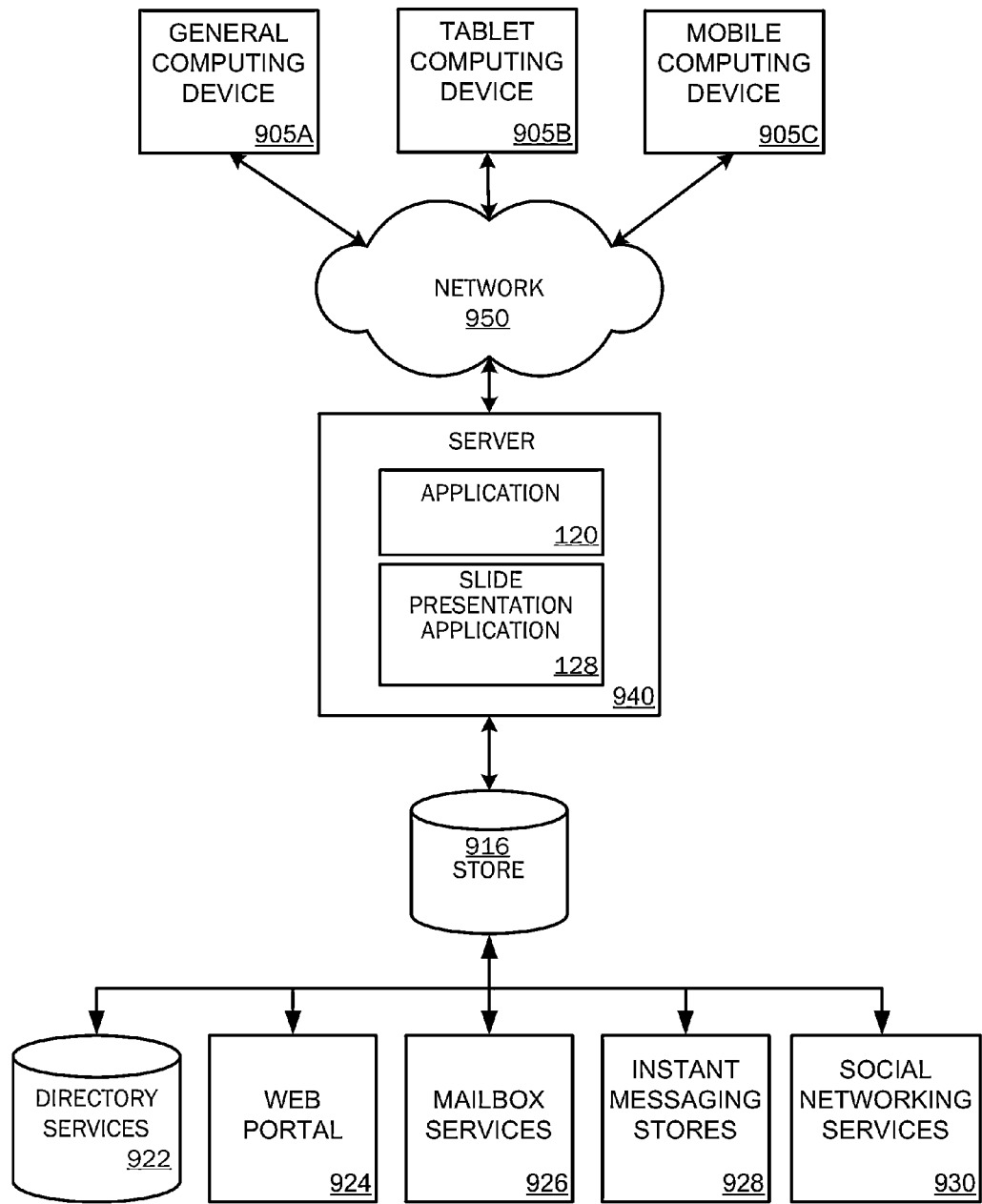
FIG. 9 is a simplified block diagram of a distributed computing system in which embodiments of the present invention may be practiced.

FIGS. 7-9 and the associated descriptions provide a discussion of a variety of operating environments in which embodiments of the invention may be practiced. However, the devices and systems illustrated and discussed with respect to FIGS. 7-9 are for purposes of example and illustration and are not limiting of a vast number of computing device configurations that may be utilized for practicing embodiments of the invention, described herein.

FIG. 7 is a block diagram illustrating physical components (i.e., hardware) of a computing device 700 with which embodiments of the invention may be practiced. The computing device components described below may be suitable for the computing devices described above. In a basic configuration, the computing device 700 may include at least one processing unit 702 and a system memory 704. Depending on the configuration and type of computing device, the system memory 704 may comprise, but is not limited to, volatile storage (e.g., random access memory), non-volatile storage (e.g., read-only memory), flash memory, or any combination of such memories. The system memory 704 may include an operating system 705 and one or more program modules 706 suitable for running software applications 720 such as slide presentation application 128. The operating system 705, for example, may be suitable for controlling the operation of the computing device 700. Furthermore, embodiments of the invention may be practiced in conjunction with a graphics library, other operating systems, or any other application program and is not limited to any particular application or system. This basic configuration is illustrated in FIG. 7 by those components within a dashed line 708. The computing device 700 may have additional features or functionality. For example, the computing device 700 may also include additional data storage devices (removable and/or non-removable) such as, for example, magnetic disks, optical disks, or tape. Such additional storage is illustrated in FIG. 7 by a removable storage device 709 and a non-removable storage device 710.

As stated above, a number of program modules and data files may be stored in the system memory 704. While executing on the processing unit 702, the program modules 706 may perform processes including, but not limited to, one or more of the stages of the method 600 illustrated in FIG. 6. Other program modules that may be used in accordance with embodiments of the present invention may include applications 120, such as, electronic mail and contacts applications, word processing applications, spreadsheet applications, database applications, slide presentation applications 128, notes applications, drawing or computer-aided application programs, etc.

Furthermore, embodiments of the invention may be practiced in an electrical circuit comprising discrete electronic elements, packaged or integrated electronic chips containing logic gates, a circuit utilizing a microprocessor, or on a single chip containing electronic elements or microprocessors. For example, embodiments of the invention may be practiced via a system-on-a-chip (SOC) where each or many of the components illustrated in FIG. 7 may be integrated onto a single integrated circuit. Such an SOC device may include one or more processing units, graphics units, communications units, system virtualization units and various application functionality all of which are integrated (or "burned") onto the chip substrate as a single integrated circuit. When operating via an SOC, the functionality, described herein, may be operated via application-specific logic integrated with other components of the computing device 700 on the single integrated circuit (chip). Embodiments of the invention may also be practiced using other technologies capable of performing logical operations such as, for example, AND, OR, and NOT, including but not limited to mechanical, optical, fluidic, and quantum technologies. In addition, embodiments of the invention may be practiced within a general purpose computer or in any other circuits or systems.

The computing device 700 may also have one or more input device(s) 712 such as a keyboard, a mouse, a pen, a sound input device, a touch input device, etc. The computing device 700 may also have one or more sensors, such as an accelerometer, a light sensor, a proximity sensor, a GPS, a gyroscope, a tilt sensor, etc. The output device(s) 714 such as a display, speakers, a printer, etc. may also be included. The aforementioned devices are examples and others may be used. The computing device 700 may include one or more communication connections 716 allowing communications with other computing devices 718. Examples of suitable communication connections 716 include, but are not limited to, RF transmitter, receiver, and/or transceiver circuitry; universal serial bus (USB), parallel, and/or serial ports.

The term computer readable media as used herein may include computer storage media. Computer storage media may include volatile and nonvolatile, removable and non-removable media implemented in any method or technology for storage of information, such as computer readable instructions, data structures, or program modules. The system memory 704, the removable storage device 709, and the non-removable storage device 710 are all computer storage media examples (i.e., memory storage.) Computer storage media may include RAM, ROM, electrically erasable read-only memory (EEPROM), flash memory or other memory technology, CD-ROM, digital versatile disks (DVD) or other optical storage, magnetic cassettes, magnetic tape, magnetic disk storage or other magnetic storage devices, or any other article of manufacture which can be used to store information and which can be accessed by the computing device 700. Any such computer storage media may be part of the computing device 700.

FIGS. 8A and 8B illustrate a mobile computing device 800, for example, a mobile telephone, a smart phone, a tablet personal computer, a laptop computer, and the like, with which embodiments of the invention may be practiced. With reference to FIG. 8A, one embodiment of a mobile computing device 800 for implementing the embodiments is illustrated. In a basic configuration, the mobile computing device 800 is a handheld computer having both input elements and output elements. The mobile computing device 800 typically includes a display 805 and one or more input buttons 810 that allow the user to enter information into the mobile computing device 800. The display 805 of the mobile computing device 800 may also function as an input device (e.g., a touch screen display). If included, an optional side input element 815 allows further user input. The side input element 815 may be a rotary switch, a button, or any other type of manual input element. In alternative embodiments, mobile computing device 800 may incorporate more or less input elements. For example, the display 805 may not be a touch screen in some embodiments. In yet another alternative embodiment, the mobile computing device 800 is a portable phone system, such as a cellular phone. The mobile computing device 800 may also include an optional keypad 835. Optional keypad 835 may be a physical keypad or a "soft" keypad generated on the touch screen display. In various embodiments, the output elements include the display 805 for showing a graphical user interface (GUI), a visual indicator 820 (e.g., a light emitting diode), and/or an audio transducer 825 (e.g., a speaker). In some embodiments, the mobile computing device 800 incorporates a vibration transducer for providing the user with tactile feedback. In yet another embodiment, the mobile computing device 800 incorporates input and/or output ports, such as an audio input (e.g., a microphone jack), an audio output (e.g., a headphone jack), and a video output (e.g., a HDMI port) for sending signals to or receiving signals from an external device. The mobile computing device 800 may comprise one or more sensors, such as an accelerometer, a light sensor, a proximity sensor, a GPS, a gyroscope, a tilt sensor, etc.

FIG. 8B is a block diagram illustrating the architecture of one embodiment of a mobile computing device. That is, the mobile computing device 800 can incorporate a system (i.e., an architecture) 802 to implement some embodiments. In one embodiment, the system 802 is implemented as a "smart phone" capable of running one or more applications (e.g., browser, e-mail, calendaring, contact managers, messaging clients, games, and media clients/players). In some embodiments, the system 802 is integrated as a computing device, such as an integrated personal digital assistant (PDA) and wireless phone.

One or more application programs 120, which may include a slide presentation application 128, may be loaded into the memory 862 and run on or in association with the operating system 864. Examples of the application programs include phone dialer programs, e-mail programs, personal information management (PIM) programs, notes applications, word processing programs, spreadsheet programs, Internet browser programs, messaging programs, and so forth. The system 802 also includes a non-volatile storage area 868 within the memory 862. The non-volatile storage area 868 may be used to store persistent information that should not be lost if the system 802 is powered down. The application programs 120, which may include a slide presentation application 128, may use and store information in the non-volatile storage area 868, such as e-mail or other messages used by an e-mail application, and the like. A synchronization application (not shown) also resides on the system 802 and is programmed to interact with a corresponding synchronization application resident on a host computer to keep the information stored in the non-volatile storage area 868 synchronized with corresponding information stored at the host computer. As should be appreciated, other applications may be loaded into the memory 862 and run on the mobile computing device 800.

The system 802 has a power supply 870, which may be implemented as one or more batteries. The power supply 870 might further include an external power source, such as an AC adapter or a powered docking cradle that supplements or recharges the batteries.

The system 802 may also include a radio 872 that performs the function of transmitting and receiving radio frequency communications. The radio 872 facilitates wireless connectivity between the system 802 and the "outside world," via a communications carrier or service provider. Transmissions to and from the radio 872 are conducted under control of the operating system 864. In other words, communications received by the radio 872 may be disseminated to the application programs 120 via the operating system 864, and vice versa.

The visual indicator 820 may be used to provide visual notifications and/or an audio interface 874 may be used for producing audible notifications via the audio transducer 825. In the illustrated embodiment, the visual indicator 820 is a light emitting diode (LED) and the audio transducer 825 is a speaker. These devices may be directly coupled to the power supply 870 so that when activated, they remain on for a duration dictated by the notification mechanism even though the processor 860 and other components might shut down for conserving battery power. The LED may be programmed to remain on indefinitely until the user takes action to indicate the powered-on status of the device. The audio interface 874 is used to provide audible signals to and receive audible signals from the user. For example, in addition to being coupled to the audio transducer 825, the audio interface 874 may also be coupled to a microphone to receive audible input, such as to facilitate a telephone conversation. In accordance with embodiments of the present invention, the microphone may also serve as an audio sensor to facilitate control of notifications. The system 802 may further include a video interface 876 that enables an operation of an on-board camera 830 to record still images, video stream, and the like.

A mobile computing device 800 implementing the system 802 may have additional features or functionality. For example, the mobile computing device 800 may also include additional data storage devices (removable and/or non-removable) such as, magnetic disks, optical disks, or tape. Such additional storage is illustrated in FIG. 8B by the non-volatile storage area 868.

Data/information generated or captured by the mobile computing device 800 and stored via the system 802 may be stored locally on the mobile computing device 800, as described above, or the data may be stored on any number of storage media that may be accessed by the device via the radio 872 or via a wired connection between the mobile computing device 800 and a separate computing device associated with the mobile computing device 800, for example, a server computer in a distributed computing network, such as the Internet. As should be appreciated such data/information may be accessed via the mobile computing device 800 via the radio 872 or via a distributed computing network. Similarly, such data/information may be readily transferred between computing devices for storage and use according to well-known data/information transfer and storage means, including electronic mail and collaborative data/information sharing systems.

FIG. 9 illustrates one embodiment of the architecture of a system for providing an improved dynamic user interface, as described above. Content developed, interacted with, or edited in association with an application 120, which may include a slide presentation application 128, may be stored in different communication channels or other storage types. For example, various documents may be stored using a directory service 922, a web portal 924, a mailbox service 926, an instant messaging store 928, or a social networking site 930. The application 120, which may include a slide presentation application 128, may use any of these types of systems or the like for enabling data utilization, as described herein. A server 130 may provide the application 120 (e.g., slide presentation application 128) to clients. As one example, the server 940 may be a web server providing the application 120 (e.g., slide presentation application 128) over the web. The server 950 may provide the application 120 (e.g., slide presentation application 128) over the web to clients through a network 950. By way of example, the client computing device 110 may be implemented and embodied in a personal computer 905A, a tablet computing device 905B and/or a mobile computing device 905C (e.g., a smart phone). Any of these embodiments of the client computing device 905A, 905B, 905C may obtain content from the store 916.

Embodiments of the present invention, for example, are described above with reference to block diagrams and/or operational illustrations of methods, systems, and computer program products according to embodiments of the invention. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

The description and illustration of one or more embodiments provided in this application are not intended to limit or restrict the scope of the invention as claimed in any way. The embodiments, examples, and details provided in this application are considered sufficient to convey possession and enable others to make and use the best mode of claimed invention. The claimed invention should not be construed as being limited to any embodiment, example, or detail provided in this application. Regardless of whether shown and described in combination or separately, the various features (both structural and methodological) are intended to be selectively included or omitted to produce an embodiment with a particular set of features. Having been provided with the description and illustration of the present application, one skilled in the art may envision variations, modifications, and alternate embodiments falling within the spirit of the broader aspects of the general inventive concept embodied in this application that do not depart from the broader scope of the claimed invention.

We claim:

1. A method for providing a preview of dynamic content in a dynamic content preview pane, the method comprising:
    receiving an indication of a selection to display a page including content;
    determining if the content of the page comprises dynamic content;
    in response to determining that the content of the page comprises dynamic content, providing a static representation of the page in a main viewing area and the dynamic content in an inset pane; and
    in response to determining that the content of the page does not comprise dynamic content, providing the static representation of the page without displaying the inset pane.

2. The method of claim 1, further comprising:
    if the page does not comprise dynamic content, providing a notification that the page does not comprise dynamic content.

3. The method of claim 1, wherein determining if a page comprises dynamic content comprises determining if a page comprises one or more of:
    an animation;
    a transition effect;
    video content; or
    interactive content.

4. The method of claim 1, wherein receiving an indication of a selection to display a page comprises receiving an indication of a selection to display a slide of a slide presentation.

5. The method of claim 1, wherein providing dynamic content in an inset pane comprises providing the dynamic content in a loop while the static representation of the page is displayed in a main viewing area.

6. The method of claim 1, wherein providing dynamic content in an inset pane comprises providing the dynamic content a predetermined number of times while the static representation of the page is displayed in a main viewing area.

7. The method of claim 1, wherein providing dynamic content in an inset pane comprises providing the dynamic content upon receiving an indication of a selection to play the dynamic content.

8. A system for providing a preview of dynamic content in a dynamic content preview pane, the system comprising:
   one or more processors; and
   a memory coupled to the one or more processors, the one or more processors operable to:
      receive an indication of a selection to display a page including content;
      determine if the content of the page comprises dynamic content;
      in response to determining that the content of the page comprises dynamic content, provide a static representation of the page in a main viewing area and the dynamic content in an inset pane; and
      in response to determining that the content of the page does not comprise dynamic content, providing the static representation of the page without displaying the inset pane.

9. The system of claim 8, wherein if the page does not comprise dynamic content, the processor is further operable to provide a notification that the page does not comprise dynamic content.

10. The system of claim 8, wherein the processor, in determining if a page comprises dynamic content, is further operable to determine if a page comprises one or more of:
   an animation;
   a transition effect;
   video content; or
   interactive content.

11. The system of claim 8, wherein the processor, in receiving an indication of a selection to display a page, is further operable to receive an indication of a selection to display a slide of a slide presentation.

12. The system of claim 8, wherein the processor, in providing dynamic content in an inset pane, if further operable to provide the dynamic content in a loop while the static representation of the page is displayed in a main viewing area.

13. The system of claim 8, wherein the processor, in providing dynamic content in an inset pane, is further operable to provide the dynamic content a predetermined number of times while the static representation of the page is displayed in a main viewing area.

14. The system of claim 8, wherein the processor, in providing dynamic content in an inset pane, is further operable to provide the dynamic content upon receiving an indication of a selection to play the dynamic content.

15. A physical computer readable storage medium containing computer executable instructions which, when executed by a computer, perform a method for providing a preview of dynamic content in a dynamic content preview pane, the method comprising:
   receiving an indication of a selection to display a page including content;
   determining if the content of the page comprises dynamic content, wherein the dynamic content includes one or more of:
      an animation;
      a transition effect;
      video content; or
      interactive content;
   in response to determining that the content of the page comprises dynamic content, providing a static representation of the page in a main viewing area and the dynamic content in an inset pane; and
   in response to determining that the content of the page does not comprise dynamic content, providing the static representation of the page without displaying the inset pane.

16. The physical computer readable storage medium of claim 15, further comprising:
   if the page does not comprise dynamic content, providing a notification that the page does not comprise dynamic content.

17. The physical computer readable storage medium of claim 15, wherein receiving an indication of a selection to display a page comprises receiving an indication of a selection to display a slide of a slide presentation.

18. The physical computer readable storage medium of claim 15, wherein providing dynamic content in an inset pane comprises providing the dynamic content in a loop while the static representation of the page is displayed in a main viewing area.

19. The physical computer readable storage medium of claim 15, wherein providing dynamic content in an inset pane comprises providing the dynamic content a predetermined number of times while the static representation of the page is displayed in a main viewing area.

20. The physical computer readable storage medium of claim 15, wherein the inset pane comprises a functionality control, which when selected causes the dynamic content to play in a main viewing area.

* * * * *